(12) United States Patent
Armstrong et al.

(10) Patent No.: US 6,722,210 B2
(45) Date of Patent: Apr. 20, 2004

(54) SYSTEM AND METHOD FOR MEASURING AIR FLOW AT MULTIPLE POINTS OF AN AIR CHANNEL

(75) Inventors: Frank O. Armstrong, Wylie, TX (US); Thomas R. Johnston, Lubbock, TX (US)

(73) Assignee: Texas Instruments Incorporated, Dallas, TX (US)

( * ) Notice: Subject to any disclaimer, the term of this patent is extended or adjusted under 35 U.S.C. 154(b) by 40 days.

(21) Appl. No.: 10/223,996

(22) Filed: Aug. 20, 2002

(65) Prior Publication Data

US 2003/0041675 A1 Mar. 6, 2003

Related U.S. Application Data

(60) Provisional application No. 60/316,525, filed on Aug. 31, 2001.

(51) Int. Cl.$^7$ ................................................. G01F 1/37
(52) U.S. Cl. ................................................. 73/861.52
(58) Field of Search ......................... 73/861.52, 201, 73/861.04, 861.42, 861.58, 861.61; 138/39

(56) References Cited

U.S. PATENT DOCUMENTS

| | | | | |
|---|---|---|---|---|
| 4,133,021 A | * | 1/1979 | King et al. | 361/660 |
| 4,481,829 A | * | 11/1984 | Shortridge | 73/861.66 |
| 5,596,152 A | * | 1/1997 | Bergervoet et al. | 73/861.83 |
| 6,053,055 A | * | 4/2000 | Nelson | 73/861.52 |
| 6,186,179 B1 | * | 2/2001 | Hill | 138/39 |
| 6,386,029 B1 | * | 5/2002 | Katzman et al. | 73/201 |
| 6,422,092 B1 | * | 7/2002 | Morrison et al. | 73/861.04 |

* cited by examiner

Primary Examiner—Edward Lefkowitz
Assistant Examiner—Jewel V. Thompson
(74) Attorney, Agent, or Firm—Yingsheng Tung; Wade James Brady, III; Frederick J. Telecky, Jr.

(57) ABSTRACT

A device measures air flow at multiple points in an air channel. The device includes a metering plate that has multiple passages through the metering plate. The metering plate is adapted to be positioned across the air channel in an orientation that places two or more of the multiple passages at two or more respective locations within the air channel. The metering plate is also adapted to receive two or more flow meters at the two or more passages, respectively. In addition, the metering plate is configured so that respective air flow velocities at the two or more locations when the metering plate is positioned across the air channel substantially matches air flow velocities at the two or more locations when the metering plate is not positioned across the air channel. An example embodiment includes holders such as sockets that keep the flow meters fixed in the metering plate with regard to pitch and roll.

20 Claims, 4 Drawing Sheets

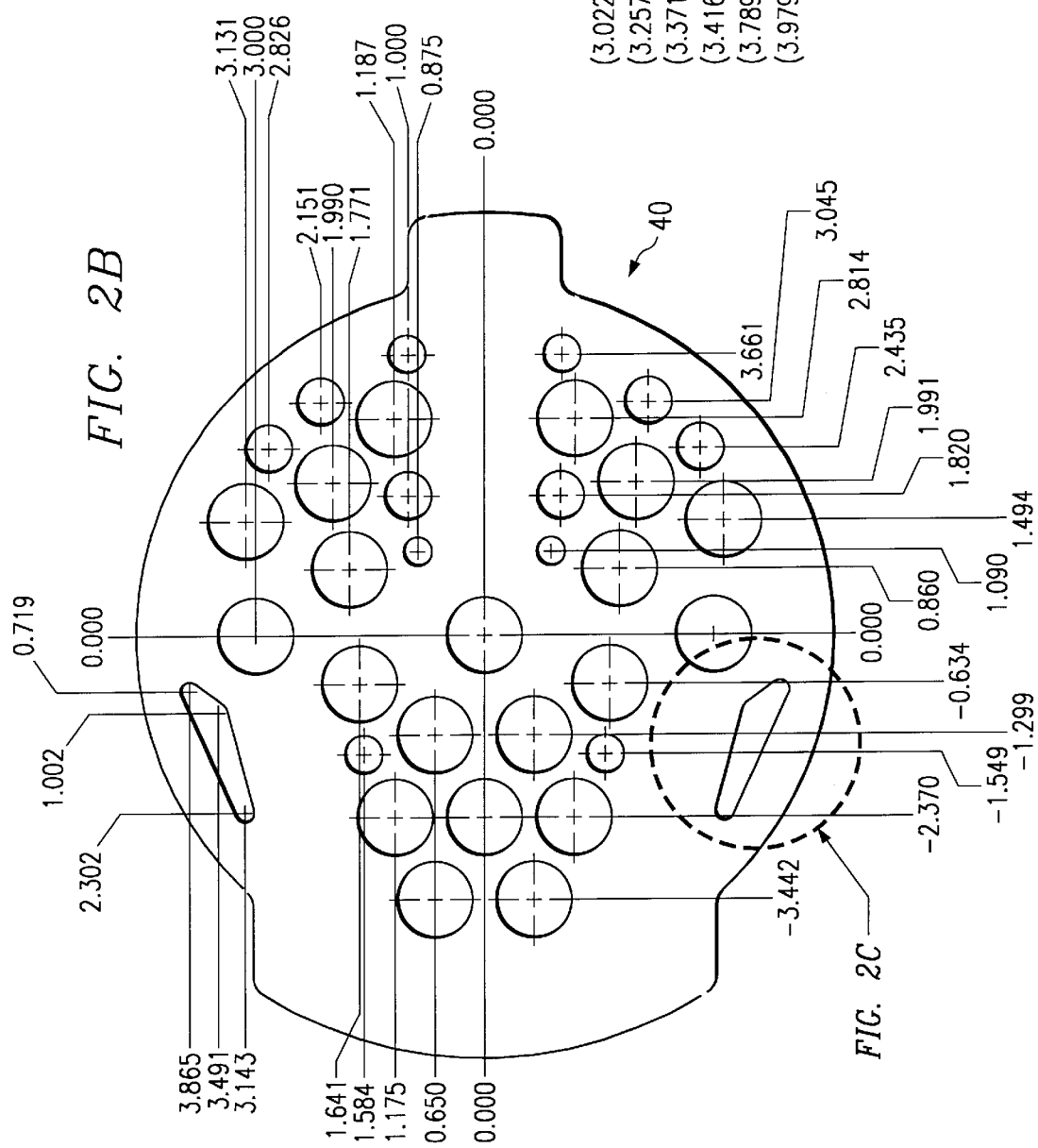

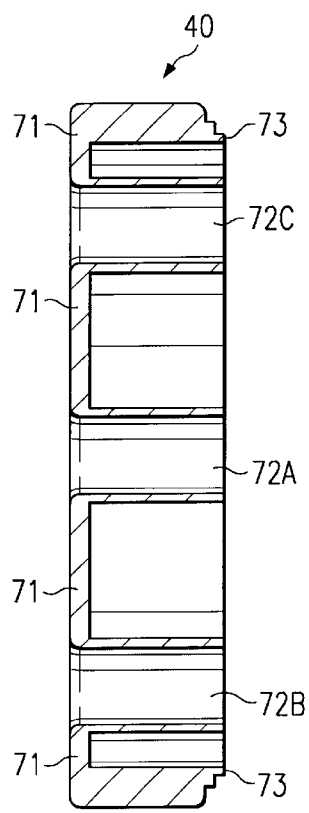 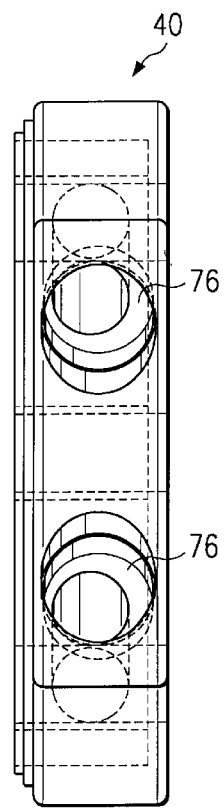 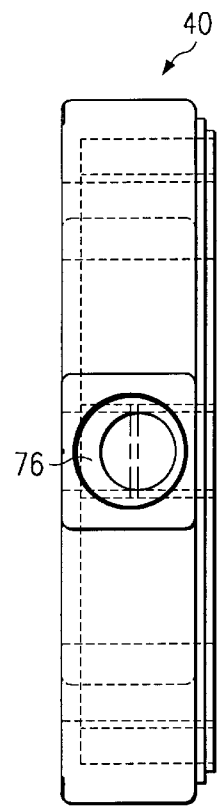
FIG. 3    FIG. 4    FIG. 5
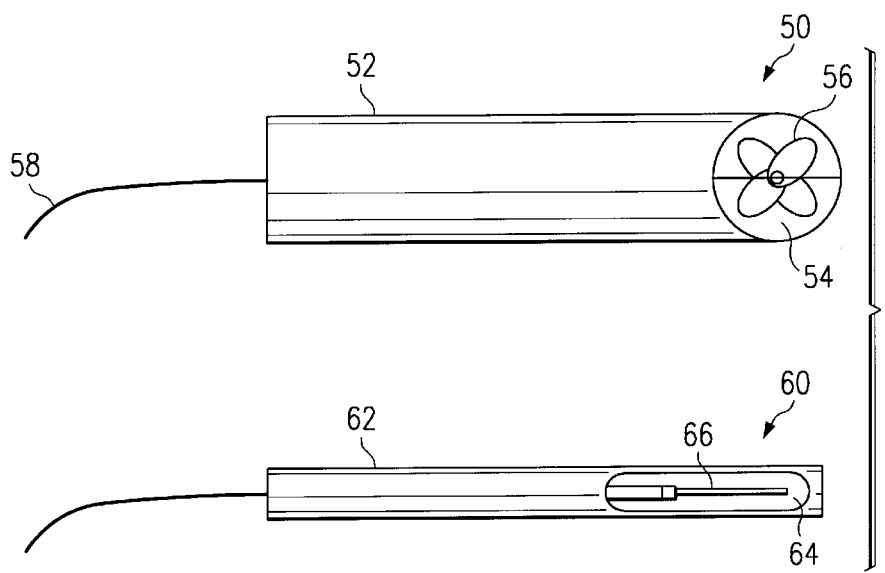
FIG. 6

SYSTEM AND METHOD FOR MEASURING AIR FLOW AT MULTIPLE POINTS OF AN AIR CHANNEL

This application claims priority under 35 USC 119(e)(1) of provisional application No. 60/316,525 filed Aug. 31, 2001.

TECHNICAL FIELD OF THE INVENTION

This invention relates in general to measuring air flow. In particular, this invention relates to systems and methods for measuring air flow at multiple points of an air channel.

BACKGROUND OF THE INVENTION

A critical step in the process of manufacturing integrated circuits from a silicon wafer is coating the silicon wafer with a uniform layer of photoresist. Typically, the photoresist is applied to the wafer by a machine known as a spin coater. A spin coater may stand alone, or it may be included in a track system with other devices that perform tasks such as baking the wafer and developing the photoresist.

In a typical application, the spin coater includes a dispenser that deposits the photoresist onto the substrate (i.e., the wafer) and a substrate support (e.g., a circular platter) that rotates while holding the substrate to cause the photoresist to spread out over the surface of the substrate. The spin coater also includes a high efficiency particulate air (HEPA) filter, and the spin coater directs filtered air from the HEPA filter towards the wafer to help disperse the photoresist. The space separating the HEPA filter and the wafer is known as the air channel.

In order to obtain a uniform thickness of photoresist on the wafer, it is important for the air flow in the air channel to be uniform across the wafer. For example, if the air flow has greater velocity at the center portion of the wafer than at intermediate or edge portions, the spin coater is likely to leave a thinner coating of photoresist at the center. Accordingly, manufacturers of spin coaters typically publish guidelines which specify acceptable air velocity measurements for the spin coaters. For example, guidelines may specify that air flow velocity for a particular application should be between 4.95 and 5.05 feet per second at six different points in a cross section of the air channel, with the cross section located two inches above the substrate support.

Consequently, integrated circuit manufacturers periodically measure air flow velocities in spin-coater air channels to determine whether the air flows conform to the required guidelines. If the air flow for a spin coater is out of specification, corrective actions are taken. For example, the HEPA air filter may be cleaned or replaced, or a service technician may be called in to repair or adjust other parts of the spin coater.

In a conventional facility for manufacturing integrated circuits, the operator of the spin coater uses a hand-held anemometer to take the required air-flow readings. However, as recognized by the present invention, there are numerous disadvantages associated with this practice. Among those disadvantage is that readings taken with a hand-held anemometer typically are not sufficiently accurate. For example, inaccurate readings may be caused by holding the operative end of the anemometer slightly out of position in the air channel, tilting the anemometer so that its longitudinal axis is not perpendicular to the air channel, and/or rolling the anemometer (i.e., rotating the anemometer about its longitudinal axis) so that the opening in its operative end is not properly aligned with the air channel.

Therefore, as recognized by the present invention, a need exists for more reliable devices and methods for measuring air flow in air channels such as those used in spin coaters.

SUMMARY OF THE INVENTION

One aspect of the invention is a metering plate for measuring air flow at multiple points in an air channel. The metering plate includes a body that has multiple passages through the body. The body is adapted to be positioned across the air channel in an orientation that places two or more of the multiple passages at two or more respective locations within the air channel. The body is also adapted to receive two or more flow meters at the two or more passages, respectively. In addition, the body is configured so that respective air flow velocities at the two or more locations when the body is positioned across the air channel substantially matches air flow velocities at the two or more locations when the body is not positioned across the air channel. Accordingly, the metering plate can be used to measure the air flow velocities at the two or more locations without substantially altering the air flow velocities at the two or more locations.

In an example embodiment, the body includes two or more holders dimensioned to secure the two or more flow meters to the body with respect to pitch and roll. Consequently, different sets of measurements made with the device at different times accurately reflect differences in air flow at the different times.

An advantage of a metering plate according to the invention is that it can be used to obtain highly accurate readings from different machines. Similarly, such a metering plate can be used to obtain highly accurate readings from the same machine at different times. Consequently, the invention makes it possible to reliably compare air flow readings from the same machine over time and to reliably compare air flow readings from different machines. The invention thus provides advantages to manufacturers and users of machines like spin coaters, which have air channels and precise requirements for the air flow within the air channels. For example, the present invention helps integrated circuit manufacturers keep spin coaters functioning properly, which increases manufacturing efficiency and product quality.

BRIEF DESCRIPTION OF THE DRAWINGS

The present invention and its numerous objects, features, and advantages may be better understood by reference to the following description of an example embodiment and the accompanying drawings, in which:

FIGS. 2A and 2B are top views of the metering plate of FIG. 1;

FIG. 2C is an expanded view of the portion of FIG. 2B indicated by a dashed circle;

FIG. 3 is a sectional view of the metering plate of FIG. 2A taken along the line A—A;

FIG. 4 is a left side view of the metering plate of FIG. 2A;

FIG. 5 is a right side view of the metering plate of FIG. 2A;

FIG. 6 is a top view of two different types of flow meters;

DETAILED DESCRIPTION OF AN EXAMPLE EMBODIMENT

Figure 1:
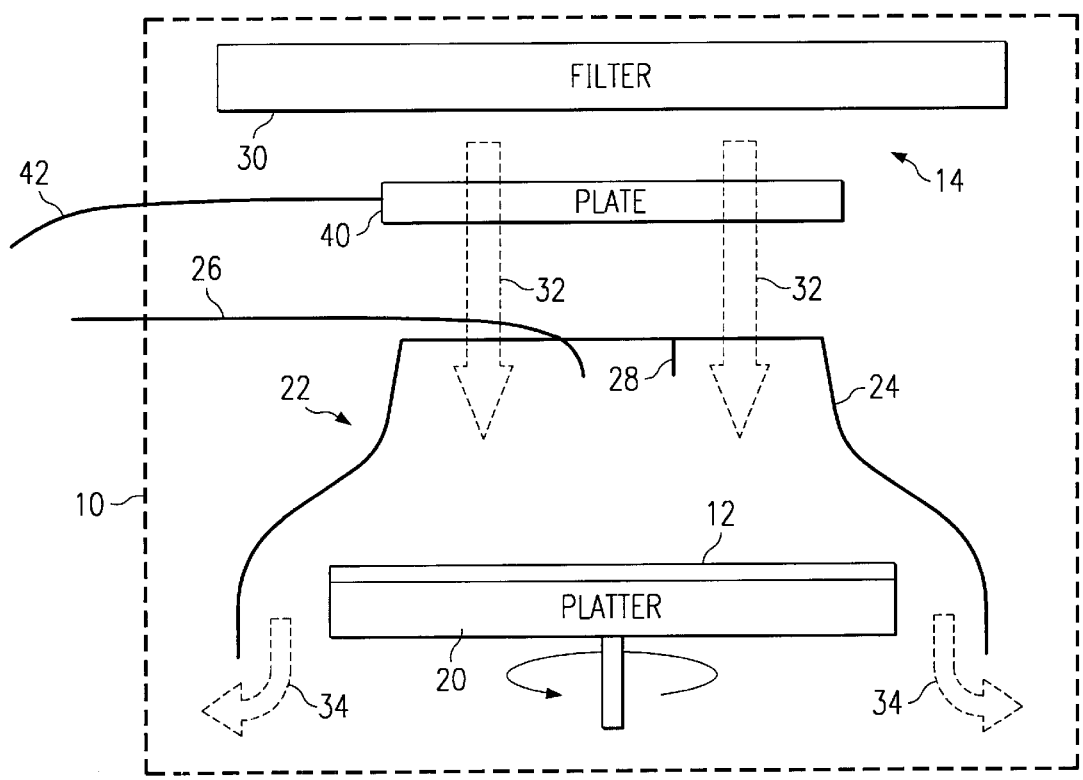
FIG. 1 is a side view of a spin coating machine with an example metering plate according to the present invention positioned in the air channel of the spin coating machine.

FIG. 1 illustrates a spin coater 10 that includes an air channel 14 between a HEPA filter 30 and a substrate support, such as rotating platter 20. A silicon wafer 12 is shown resting on platter 20. Surrounding platter 20 and wafer 12 is a cup or bowl 22. Bowl 22 includes a circular wall 24 that catches photoresist flung from the edge of wafer 12 and helps direct air from filter 30 towards and past wafer 12. Bowl 22 also includes an upper opening for receiving air and photoresist. A dispenser 26 discharges the coating material (i.e., the photoresist) onto wafer 12 via the upper opening of the bowl. As described in greater detail below, an index mark 28 on wall 24 of bowl 22 may be used when measuring air flow in air channel 14.

An example embodiment of a metering plate 40 according to the present invention is also depicted in FIG. 1. Metering plate 40 is positioned across air channel 14. An electrical lead 42 carries signals representing air flow velocity measurements from metering plate 40 to a display or recording device. Dashed block arrows 32 represent incoming air that is flowing down to wafer 12 in channel 14, and dashed block arrows 34 represent exhaust air that has passed wafer 12.

Figure 2A:
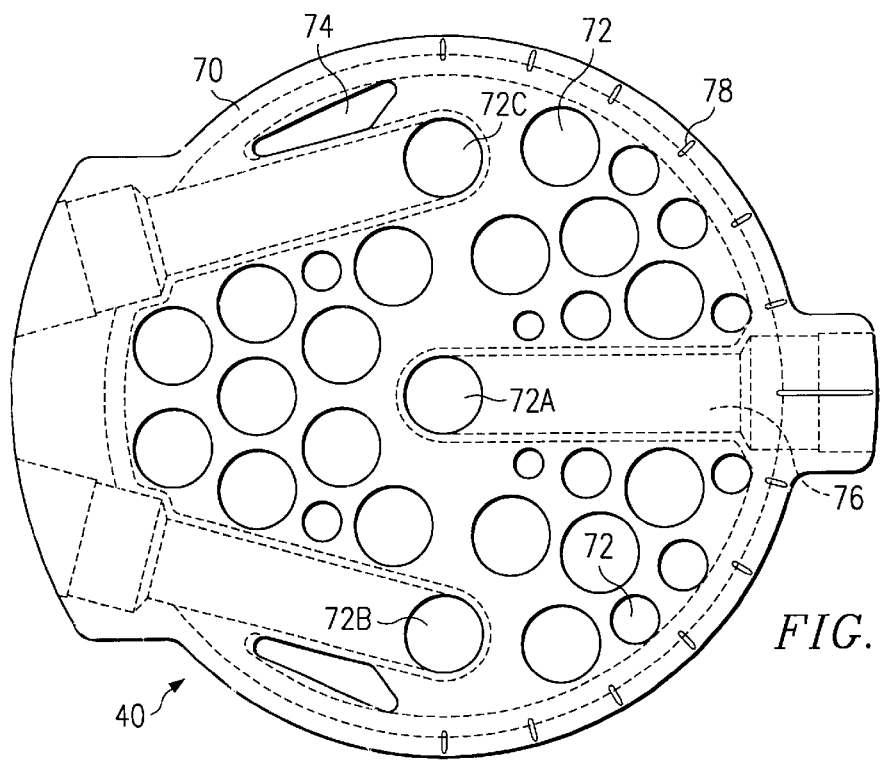

Referring now to FIG. 2A, a top view of metering plate 40 reveals that the body of metering plate 40 has an outer edge 70 and numerous circular openings 72 dispersed about the central portion of the body. Circular openings 72 provide passages for air to flow through metering plate 40. Two irregular openings 74 also provide passages for air flow.

In addition, the body includes three sockets 76, and each socket 76 is dimensioned to receive and firmly retain a flow meter. Flow meters may also be referred to as anemometers. In the example embodiment, the body is designed to accept a vane-type anemometer 50 (see FIG. 6). Alternative embodiments may be designed to accept other kinds of anemometers, such as the wire-type anemometer 60 depicted in FIG. 6.

Sockets 76 are configured to retain the operative ends of their respective anemometers at particular circular openings 72. Specifically, the operative ends are retained within a central passage 72A, a first offset passage 72B, and a second offset passage 72C. Central passage 72A is centrally located, while first and second offset passage 72B and 72C are located in opposite intermediate portions of the body, between central passage 72A and outer edge 70. Consequently, when metering plate 40 is deployed across air channel 14, central passage 72A will be positioned above the center of the substrate or substrate support, while first offset passage 72B and second offset passage 72C will reside above opposite intermediate portions of the substrate or substrate support.

When metering plate 40 is deployed across air channel 14, passages 72A, 72B, and 72C occupy three respective points in a cross section of air channel 14. Consequently, the three anemometers will measure the velocities of the air flows at those three points. In the example embodiment, that cross section lies parallel to platter 20, at a particular distance from platter 20. In addition, as described in greater detail below, metering plate 40 may be rotated to obtain air flow measurement for additional points in the cross section. Moreover, the distance between the cross section and platter 20 may be set or adjusted in any appropriate manner. For instance, metering plate 40 may be placed directly on a lip at the upper opening of bowl 22. Alternatively, one or more collars or spacers may be placed between bowl 22 and metering plate 40 to elevate the cross section to a desired height above platter 20.

Furthermore, openings 72 and 74 are configured to provide a very specific result when metering plate 40 is deployed across air channel 14. Specifically, metering plate 40 is designed to cause air to flow through the point surrounded by passage 72A with the same velocity that is normally realized at that point. That is, the velocity of the air flow at that point does not change when metering plate 40 is deployed in air channel 14. Moreover, metering plate 40 causes the same result for passages 72B and 72C. That is, the velocities of the air flows at the points surrounded by those two passages also do not change when metering plate 40 is deployed in air channel 14.

The top view of FIGS. 2B and 2C set forth the specific measurements used in the example embodiment to achieve these results with spin coaters for eight-inch wafers. In alternative embodiments, the metering plate is scaled up or down to measure airflow in machines such as spin coaters designed for wafers of different sizes. The sectional view of FIG. 3 shows the top surface 71 of metering plate 40, as well as channels or openings through top surface 71 at passages 72A–72C. FIG. 3 also depicts the bottom 73 of metering plate 40. FIG. 4 shows two sockets 76 for receiving two of the anemometers, and the right side view of FIG. 5 shows another socket 76 for receiving the third anemometer.

Any suitable means may be used to secure the anemometers within sockets 76. Once the anemometers are secured in sockets 76, metering plate 40 keeps the anemometers fixed with regard to pitch and roll, so that the anemometers produce consistently reliable air velocity readings. For instance, in the example embodiment, when metering plate 40 is deployed across air channel 14, sockets 76 keep the anemometers parallel to platter 20 and keep the openings in the operative ends of the anemometers (e.g., see opening 54 in FIG. 6) aligned with air channel 14.

With reference to FIG. 6, in the example embodiment, metering plate 40 is designed to receive three vane-type anemometers 50. Each anemometer 50 includes a body 52 terminating in an operative end with an opening or passage 54. A collection of vanes or blades 56 disposed within passage 54 rotates in response to air flow to measure air flow velocity. A lead 58 carries signals representing the velocity measurement to a display or recording device. In the example embodiment, when the three anemometers are installed in metering plate 40, the respective passages 54 align with openings 72A–72C, and lead 42 includes the leads 58 from all three anemometers.

Figure 7:
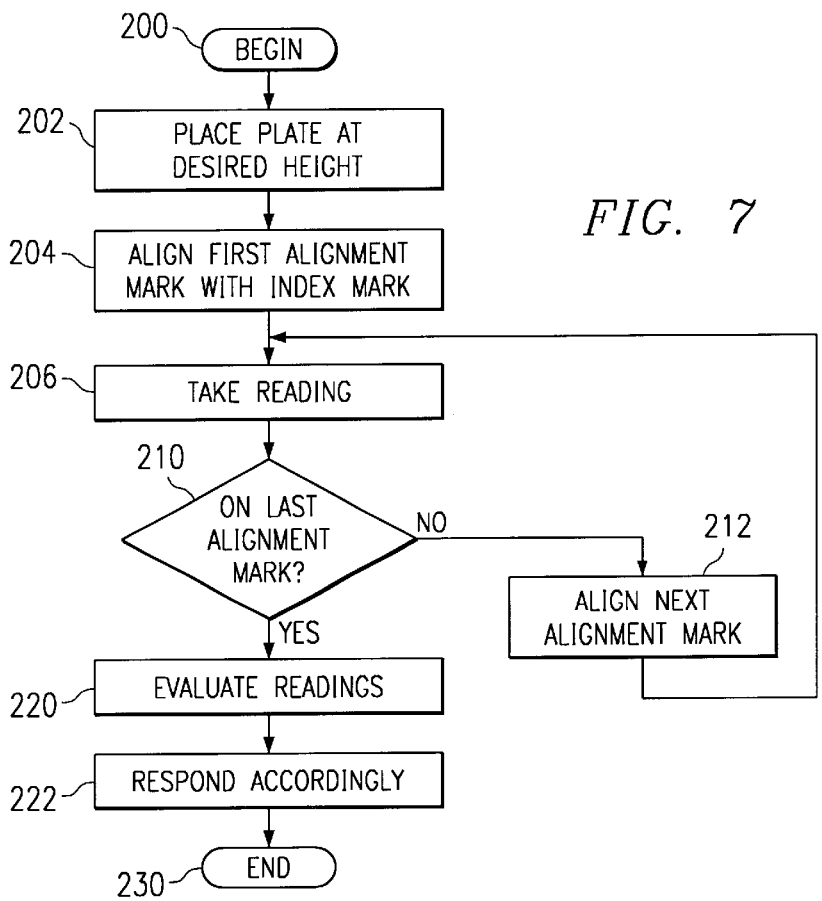
FIG. 7 is a flowchart of an example process for measuring air flow according to the present invention.

FIG. 7 presents a flowchart of an example process for measuring air flow according to the present invention. The process begins at block 200 with an operator preparing to measure air flow in a particular spin coater, for example according to a maintenance schedule or in response to problems with machine performance. To prepare, the operator obtains a metering plate such as metering plate 40 and reviews predetermined measurement procedures. In the example process, metering plate 40 will already have been equipped with anemometers and lead 42 will be connected to a display or recording device.

As shown at block 202, the operator then moves dispenser 26 out of the way and places metering plate 40 at a predetermined distance from the substrate support according to the measurement procedures. For instance, the measurement procedures may dictate placing metering plate 40 on the lip of bowl 22 or using a collar, for example, to elevate metering plate to the desired height.

Referring also to FIG. 2A, in the example device, thirteen alignment marks 78 are spaced fifteen degrees apart about half of the outer edge of metering plate 40. The thirteenth alignment mark 78 is therefore disposed one hundred and eighty degrees from the first alignment mark 78. In the example process, multiple measurements will be taken, and when the operator places metering plate 40 into position for the first reading, the operator aligns the first alignment mark 78 with index mark 28, as indicted at block 204.

As shown at block 206, the operator will then record velocity readings for the air flows at the three points in air channel 14 covered by openings 72A–72C. As indicated at block 210, the operator then determines whether the last alignment mark 78 is aligned with index mark 28. For the first 12 readings, that determination will be negative, and the process will pass to block 212, which depicts the operator rotating metering plate 40 to align the next alignment mark 78 with index mark 28. The process then return to block 206, with the operator recording the velocity readings with metering plate 40 in its new orientation. The operator continues to rotate metering plate 40 through all thirteen alignment marks 78 to record velocity measurements in this manner for a substantially complete cross section of air channel 14.

After the reading is taken at the thirteenth alignment mark 78, the determination at block 210 will be positive, and the process will flow to block 220. The recorded measurements may then be evaluated, for example in comparison with manufacturer specifications for air flow, past measurements from the subject spin coater, and/or measurements from other spin coaters.

Moreover, metering plate 40 is self-checking. Specifically, the measurement from passage 72B with the plate at the first index should match the measurement from passage 72C with the plate at the thirteenth index, as both measurements measure the same point in the air channel. Likewise, the measurement from passage 72C with the plate at the first index should match the measurement from passage 72B with the plate at the thirteenth index. Consequently, to verify any reading which indicates that a certain part of the air channel has improper air flow, measuring plate 40 may simply be rotated one hundred and eighty degrees. If readings from the new orientation verify that the airflow is improper in the same part of the air channel, it can be presumed that metering plate 40 is operating properly and the airflow is actually improper. Alternatively, if the improper readings follow the rotation of metering plate 40, rather than appearing consistent with regard to position within air channel 14, the evaluation should indicate the metering plate 40 requires service or replacement.

Appropriate actions may then be taken, based on the evaluation, as depicted at block 222. For example, if the measurements indicate that the air flow pattern within air channel 14 is unacceptable, corrective action may be taken. The process then ends, as shown at block 230.

By using a metering plate that keeps the velocity meters fixed at precisely the proper height, pitch, and rotation, the example process provides air flow velocity measurements that are more reliable than readings taken with a hand-held anemometer. In addition, the precise rotation of the points of measurement within air channel 14 results in a record of velocity measurements for a substantially complete cross section of air channel 14. That is, the measurements map velocity at numerous points or columns of air flow, with those columns dispersed regularly about three hundred and sixty degrees of the surface of a substrate.

In an alternative embodiment, the metering plate includes six or more velocity probes, and the metering plate is designed to map a substantially complete cross section of air channel 14 without being rotated. Six or more air flow columns may thus be mapped in the cross section simultaneously.

Figure 8:
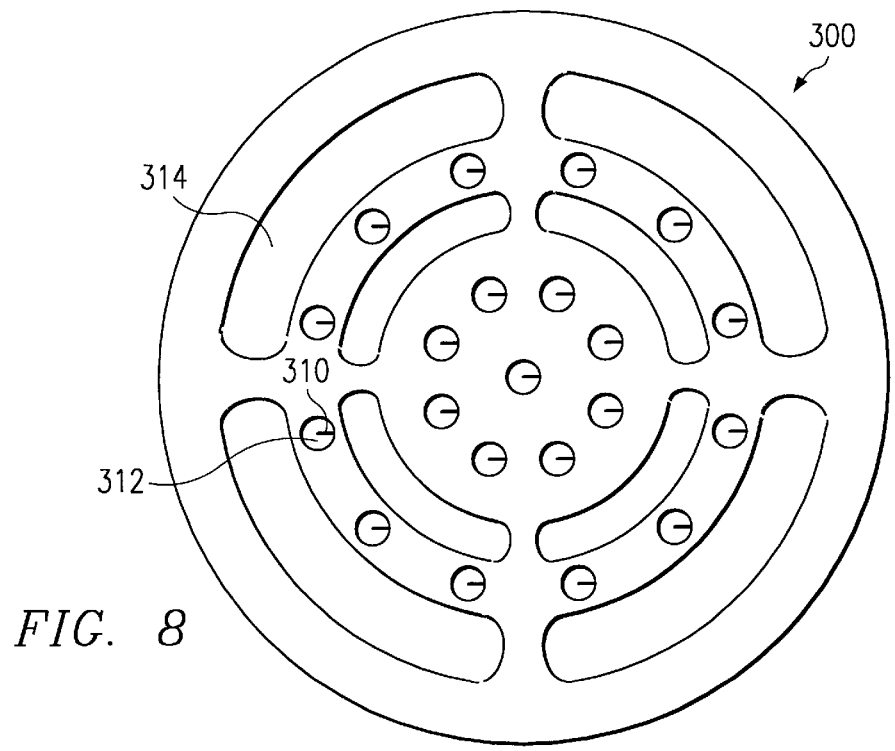
FIG. 8 is a top view of an alternative metering plate according to the present invention.

For example, FIG. 8 depicts a conceptual rendering of a metering plate 300 that has twenty-one velocity probes 310 residing in twenty-one openings or passages 312. One of passages 312 is positioned at the center of metering plate 300, corresponding with the center of the substrate. Eight passages 312 are disposed in a first circle at a first radius from the center. The remaining twelve passages 312 are arranged in a second circle at a second radius from the center. When metering plate 300 is deployed, the first and second radii align with intermediate positions on the substrate between the center and the outer edge of the substrate.

Metering plate 300 may also include additional passages 314. Metering plate 300 is designed so that, when it is deployed in air channel 14, passages 312 experience air flow velocities that match the velocities that would be realized at those same locations in air channel 14 without metering plate 300 in place.

With reference to FIG. 6, each velocity probe 310 is the same as or similar to the probe 66 of a wire-type anemometer 60. Wire-type anemometer 60 may also be referred to as a thermal mass velocity sensor 60. In a hand-held embodiment, wire-type anemometer 60 includes a body 62 terminating in an operative end that includes a passage 64. Passage 64 surrounds probe 66. Air velocity measurements are based on a temperature differential in probe 66. In metering plate 300, probes 310 are built in, and passages 312 serve as passage 64.

Since metering plate 300 measures the entire cross section at once, the measurement process may be completed more rapidly. In addition, metering plate 300 may be operated on an ongoing basis, with velocity measurements updated continuously to indicate the effects of changing conditions within the spin coater. Moreover, like metering plate 40, metering plate 300 is self-checking. However, only a small amount of rotation is necessary to align one passage 312 into position to verify readings from an adjacent passage 312. Furthermore, significantly different readings from adjacent passages 312 generally indicates that metering plate 300 is measuring inaccurately; as airflow in a relatively large channel typically changes gradually, in gradients, across the cross section.

Other Embodiments

Although the invention has been described with reference to one or more example embodiments, it should be understood that various changes and substitutions can be made without departing from the spirit and scope of the invention. For example, although sockets are used to hold the anemometers in the example embodiment, other types of holders may be used to secure the anemometers in alternative embodiments. Likewise, although the metering plate is used to measure air flow in the air channel of a spin coater in example process, metering plates according to the invention are not limited to that application, but may also be used to advantage in other types of air channels where accuracy of fluid velocity measurements is critical. For example, applications that may benefit from the invention include, without limitation, the developer process block of a track system, coater cups for hydrogen silsesquioxane (HSQ), and coater cups for spin-on glass (SOG).

The invention is therefore not limited to the example embodiment(s), but is defined by the following claims.

What is claimed is:

1. A metering plate for measuring air flow at multiple points in an air channel, the metering plate comprising:

a body having multiple passages therethrough;

the body adapted to be positioned within the air channel in an orientation that places two or more of the multiple passages at two or more respective locations within the air channel;

the body adapted to receive two or more flow meters at the two or more passages, respectively;

the body configured so that respective air flow velocities at the two or more locations when the body is positioned across the air channel substantially matches air flow velocities at the two or more locations when the body is not positioned across the air channel.

2. The metering plate of claim 1, wherein the body further comprises two or more holders dimensioned to secure the two or more flow meters to the body.

3. The metering plate of claim 1, wherein:

the two or more passages comprise a first passage and a second passage; and the metering plate further comprises first and second flow meters secured to the body to measure air flow through the first and second passages.

4. A metering plate for measuring air flow at multiple points in an air channel of a spin coating machine with a substrate support, wherein, when the air channel includes no metering plate, air flows with a first velocity at a first point in the air channel and a second velocity at a second point with the air channel, the metering plate comprising:

a body dimensioned to be received across the air channel at a predetermined distance from the substrate support, the body including first and second passages that allow air to flow in the air channel toward the substrate support;

the body configured so that, when the metering plate is positioned across the air channel with the first and second passages located at the first and second points of the air channel, air passes through the first and second passages at respective third and fourth velocities that substantially match the first and second velocities, respectively, such that air flow measurements taken at the first and second passages substantially match velocities realized when the air channel includes no metering plate.

5. The metering plate of claim 4, wherein:

the first and second passages comprise first, second, and third passages;

the body comprises an outer edge;

the first passage is approximately centrally located in the body;

the second passage is located between the first passage and the outer edge of the body; and the third passage is located between the first passage and the outer edge of the body, substantially opposite the second passage.

6. The metering plate of claim 4, wherein the coating machine includes a cup with an index mark, and the body further comprises:

a first alignment mark alignable with the index mark; and a second alignment mark alignable with the index mark, such that a first set of air flow measurements may be recorded with the first alignment mark aligned with the index mark to determine air flow velocity at the first and second points in the air channel, and a second set of air flow measurements may be recorded with the second alignment mark aligned with the index mark to determine air flow velocity at a third point in the air channel.

7. The metering plate of claim 6, wherein the body further comprises at least twelve alignment marks spaced at fifteen degree intervals, such that measurements for a substantially complete cross section of the air channel may be made by taking measurements with each of the twelve alignment marks aligned with the index mark.

8. The metering plate of claim 4, wherein:

the body has a top and a bottom; and the body is adapted to be positioned across the air channel at a predetermined distance from the substrate support with the bottom facing the substrate support.

9. The metering plate of claim 4, further comprising a holder dimensioned to secure a flow meter to the metering plate.

10. The metering plate of claim 4, further comprising first and second holders dimensioned to secure first and second flow meters to the metering plate.

11. The metering plate of claim 4, further comprising first and second sockets in the body configured to receive first and second flow meters and to keep respective operative ends of the first and second flow meters fixed, relative to the body, such that different sets of measurements made at different times with the metering plate accurately reflect differences in air flows at the different times.

12. The metering plate of claim 4, wherein:

the body comprises at least a first socket configured to receive a first flow meter;

the metering plate further comprises multiple substantially circular openings dispersed about the body; and the multiple passages include at least one irregularly shaped opening positioned adjacent to the socket.

13. The metering plate of claim 4, further comprising first and second flow meters secured to the body to measure air flow through the first and second passages, respectively.

14. The metering plate of claim 13, wherein the first and second flow meters comprise vane-type anemometers.

15. A method for measuring air flow at multiple points in an air channel, wherein, when the air channel includes no metering plate, air flows with a first velocity at a first point in the air channel and a second velocity at a second point in the air channel, the method comprising:

providing a metering plate which includes multiple passages and first and second flow meters that measure air flow through first and second passages among the multiple passages, the multiple passages configured so that when the metering plate is positioned across the air channel with the first and second passages located at the first and second points of the air channel, air passes through the first and second passages with third and fourth velocities that substantially match the first and second velocities, respectively;

positioning the metering plate across the air channel at a predetermined distance from substrate support; and recording air flow measurements from the first and second flow meters.

16. The method of claim 15, wherein the air flow measurements comprise a first set of air flow measurements, the method further comprising:

rotating the metering plate a predetermined amount; and recording a second set of air flow measurements.

17. The method of claim 15, wherein the air flow measurements comprise a first set of air flow measurements, the method further comprising:

rotating the metering plate a predetermined amount;

recording additional air flow measurements; and repeating the operations of rotating and recording until measurements have been recorded for a substantially complete cross section of the air channel.

18. The method of claim 15, wherein:

positioning the metering plate across the air channel comprises aligning a first alignment mark with an index mark;

recording air flow measurements from the first and second flow meters comprises recording a first set of air flow measurements; and the method further comprises:
  aligning a second alignment mark with the index mark; and
  recording a second set of air flow measurements.

19. The method of claim 18, further comprising:

aligning additional alignment marks with the index mark; and recording an additional set of air flow measurements for each of the additional alignment marks, such that measurements are recorded for multiple air columns dispersed about a cross section of the air channel.

20. The method of claim 15, further comprising:

evaluating the air flow measurements; and determining whether corrective action is required, based on the air flow measurements.

* * * * *